April 21, 1953
C. W. WALZ ET AL
2,635,521
WHEEL ATTACHMENT FOR DETACHABLE
TRACTOR-MOUNTED IMPLEMENTS
Original Filed Nov. 15, 1944
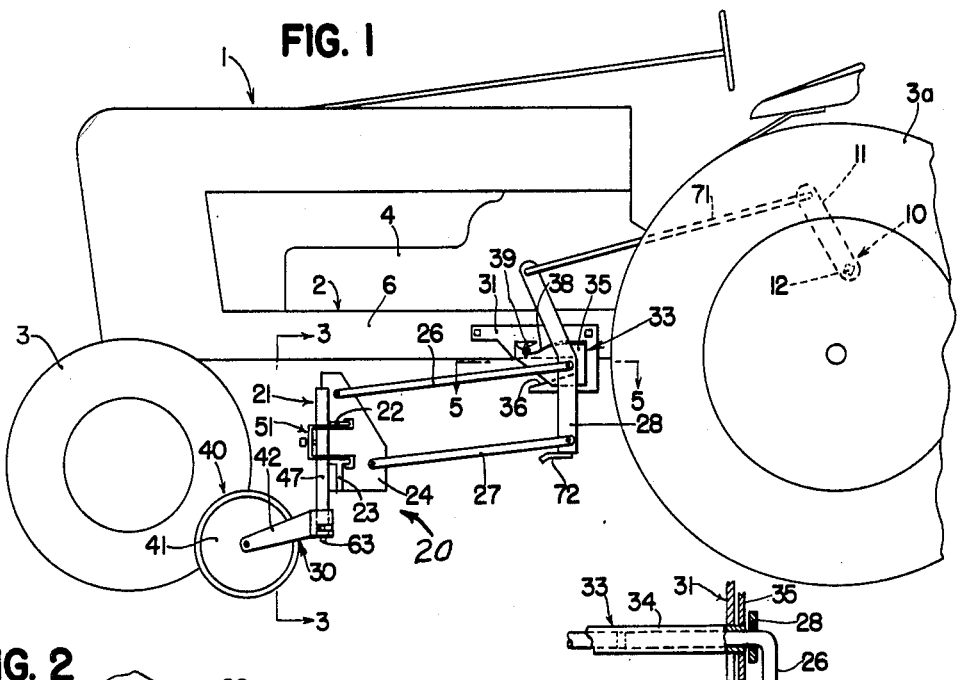
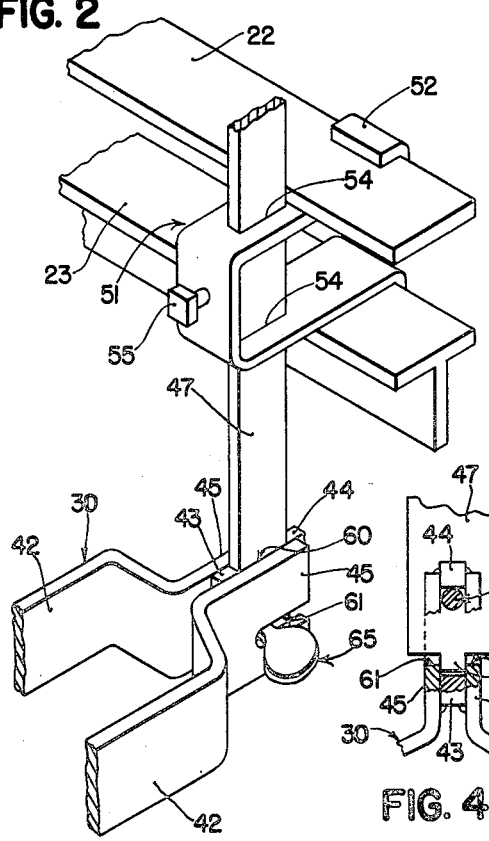
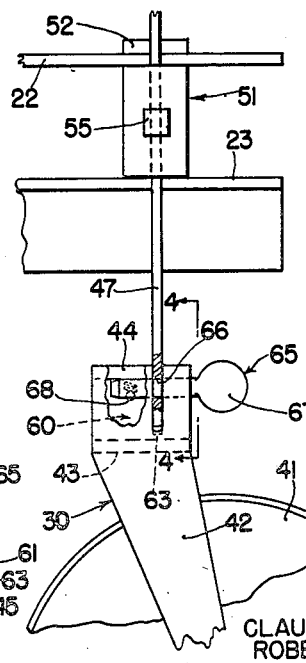
INVENTORS
CLAUDE WALZ
ROBERT D. GRIFF
ATTORNEYS Patented Apr. 21, 1953

2,635,521

UNITED STATES PATENT OFFICE 2,635,521

WHEEL ATTACHMENT FOR DETACHABLE TRACTOR-MOUNTED IMPLEMENTS

Claude W. Walz and Robert D. Griff, Rock Island, Ill., assignors to Deere & Company, Moline, Ill., a corporation of Illinois Original application November 15, 1944, Serial No. 563,543. Divided and this application August 7, 1950, Serial No. 178,016

10 Claims. (Cl. 97—189)

1

This application is a division of our co-pending application, Serial No. 563,543, filed November 15, 1944, now U. S. Patent 2,533,542, issued December 12, 1950.

The present invention relates generally to agricultural implements and more particularly to tractor mounted implements of the integral type.

The object and general nature of the present invention is the provision of a tractor mounted implement particularly constructed and arranged for quick attachment to and detachment from the tractor. More particularly, it is a feature of the present invention to provide means for facilitating the movement of a fairly long transversely arranged implement toward and away from its connected position with the tractor by transverse movement relative to the tractor. More particularly, according to the principles of the present invention, a special mounting for the gauge wheels is utilized for readily changing the gauge wheels into a position accommodating the lateral movement of the implement into and out of position with respect to the tractor, particularly underneath the central portion of the tractor. Specifically, it is a feature of this invention to provide a new and improved gauge wheel mounting which by merely removing a quick detachable pin and shifting the gauge wheel yoke into a different position on the standard to which the gauge wheel is connected, the implement may, after being detached from the tractor, be readily shifted laterally away from the tractor to complete the disconnection of the implement therefrom. Also, with the gauge wheels in the latter mentioned position, it is a relatively simple matter to roll the implement transversely of the tractor into a position underneath the same, ready for attachment to the sides of the tractor, and then by turning the gauge wheels and the gauge wheel yokes into their operating position and reconnecting the yokes to the implement frame in their new position, the implement is readily made ready for normal operation.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a side view of a tractor mounted implement in which the principles of the present invention have been incorporated.

Figure 2 is an enlarged perspective, showing the details of the gauge wheel connecting means, the parts being arranged in the positions they occupy in the normal or operating position of the gauge wheels.

Figure 3 is a view, taken generally along the line 3—3 of Figure 1, showing the gauge wheels in their transverse position, accommodating the support and movement of the implement transversely of the tractor into and out of its attaching position.

Figure 4 is a sectional view taken generally along the line 4—4 of Figure 3.

Figure 5 is a detail view, taken generally along the line 5—5 of Figure 1.

The tractor to which the implement is attached is indicated in its entirety by the reference numeral 1 and comprises a frame 2 carried on front and rear wheels 3 and 3a, the rear wheels deriving propelling power from the motor 4 of the tractor. The tractor frame 2 includes side bars 6 to which attaching plates 31 are fixed, each attaching plate 31 having a forwardly facing notch 36, which will be referred to below. The tractor 1 includes power lift mechanism 10, which may be similar to the power lift shown in the United States patent issued February 8, 1938, to E. McCormick et al., No. 2,107,760, and which includes one or more power lift arms 11 actuated by power derived from the tractor motor 4 for rocking movement about the axis of the power lift rockshaft 12, the arms 11 properly being fixed to the power lift rockshaft 12 and movable therewith through a given range from raised to lowered position.

The implement which is constructed according to the principles of the present invention is indicated in its entirety by the reference numeral 20 and comprises a frame 21 including upper and lower transverse bars 22 and 23 connected together by frame plates 24 to which the bars 22 and 23 may be welded or otherwise fixed. The bars 22 and 23 form means to which one or more ground working tools (not shown) may be fixed. The plates 24 are apertured to receive the forward ends of pairs of upper and lower links 26 and 27, the rear ends of which are pivotally connected to arms 28. By virtue of this construction the implement frame 21 is capable of free floating movement with respect to the arms 28 and the links 26 and 27 are generally parallel, whereby the operating position of the tools is not changed when the frame 21 moves upwardly or downwardly with respect to the tractor to which it is attached by the vertically swingable links. The arms 28 are adapted to be connected to the tractor 1 by a quick detachable connection which includes a pair of implement-receiving plates 31 secured to and normally forming a more or less prominent part of the tractor and an attaching member 33 which may take any suitable form but preferably consists of a pipe member 34 and a pair of plates 35 secured to the ends of the pipe member 34. The upper links 26 each have their inner ends bent so as to extend into the pipe member 34 which thereby serves as a pivot for the links 26. The tractor plates 31 are provided with tapered slots 36 which are adapted to receive the pipe member 34 of the attaching member 33, and each of the plates 35 is formed with a slot 38 which flares outwardly and faces rearwardly to receive a stud that is formed on the associated tractor plate 31. A wing nut 39 or other suitable means is provided for each stud to secure the plates 35 of the attaching member 33 in place when the implement is in a position to be connected to the tractor, as will be described in more detail below.

The implement 20 is provided with a pair of gauge wheel units 40, one at each end of the implement, and since these gauge wheel units 40 are alike, only one is shown in detail. Each gauge wheel unit 40 includes a gauge wheel 41 mounted on suitable bearings in a wheel carrier means, preferably in the form of a yoke 30 comprising a pair of gauge wheel yoke arms 42. These arms have their rear ends bent inwardly and secured together, as by welding, through a pair of spaced apart blocks 43 and 44, the rear end sections 45 of the yoke arms being welded to the blocks which space them apart a distance to form a slot receiving the lower end of an attaching means in the form of a shank 47. The shank 47 is similar to shanks which commonly are provided for securing tools and the like to the frame bars 22 and 23, each shank being secured to the bars 22 and 23 by means of a clip 51 comprising a U-shaped member having ends 52 adapted to hook over the rear edges of the bars 22 and 23 and an intermediate portion, slotted at 54, to receive the standard 47 and tapped to receive a set screw 55 which, when tightened, serves to clamp the standard 47 in the clip 51 and to fixedly secure the latter to the implement frame bars 22 and 23.

The normal operating position for the gauge wheels 40 is shown in Figure 1, where the tool has been illustrated as attached to the tractor and the wheels 41 in a position to roll forwardly. According to the principles of the present invention, however, the implement 21 is removed from and attached to the tractor by shifting the implement laterally, transversely of the tractor, into and out of a position underneath the tractor. To facilitate this attaching and detaching, we have provided an arrangement for attaching the gauge wheel units to the implement so as to accommodate readily changing the gauge wheel units 40 from a forward rolling position to a transverse rolling position. To this end, we form the rear portion of the gauge wheel yoke 30 in a particular way. Mention above was made to a slot, indicated in Figure 2 by the reference numeral 60, for receiving the lower end of the attaching standard when the associated gauge wheel is to be fixed to the implement in a forward rolling position. This slot 60 extends through the rear portion of the gauge wheel yoke 30 and is disposed substantially in the plane of the associated wheel 41. A second slot or notch 61 is formed in the rear portion of the gauge wheel yoke 30 and is disposed in a plane normal to the plane of the slot 60. The lower end of the tool shank 47 receiving the gauge wheel yoke 30 is formed with a downwardly extending lug 63 the width of which, in the plane of the standard 47, is substantially the same as the lateral dimension of the slot 60; in other words, the slot 60 is substantially the same area in cross section as the cross section of the standard 47, as shown in Figure 2, and extends all the way through the gauge wheel yoke 30. The other slot 61 is of similar configuration, being in the nature of a notch cut lengthwise into the intermediate portion of the gauge wheel yoke 30 and having a width equal to the thickness of the standard 47.

A stop arm 72 is fixed to the lower end of each of the arms 28 and spaced below the link 27 a distance sufficient to accommodate all floating action of the implement during normal use, but when the power lift 10 is actuated to rock the arm 11 rearwardly to raise the implement, the resulting swinging of the arms 28 about the transverse axis defined by the inner ends of the links 26, and the pipe member 34 receiving them, causes the stops 72 to come up against the lower edges of the associated links 27 and so raise the implement into a transport position.

Figure 2 illustrates the position of the parts when the implement is in its normal operating position, as does also Figure 1. In this position it will be seen that the lower end of the standard 47 is disposed in the slot 60 and that a quick detachable pin 65 is inserted in the transverse slot 61 and through an opening 66 formed in the lower end of the standard 47. As best shown in Figure 3, the quick detachable pin 65 is provided with a handle section 67 and is readily inserted and removed. The pin 65 is provided with a ball detent 68 which serves to prevent the inadvertent or accidental displacement of the pin 65.

When it is desired to remove the implement 21 from the tractor 1, the operator actuates the power lift 10 to raise the implement frame 21, together with the tools that are fixed thereto, into its raised position. Next, each of the gauge wheel units 40 is disconnected from its standard 47 by pulling out the associated pin 65, and then each gauge wheel unit is reconnected to the lower end of the associated standard 47 in a position with the wheels 41 in a transverse vertical plane. This is done by reconnecting each gauge wheel yoke 30 by swinging the yoke 30 around into a vertical position so that the lower end of the standard 47 enters the slot 61, with the lug 63 extending just below the bottom of the slot 61 and so interlocked between the sides 45 of the yoke pieces 42. This prevents the yokes 30 from tipping sideways. Then the pin 65 is inserted through the slot 60 and reinserted in the opening 66 in the standard 47. This securely holds each gauge wheel unit 40 in its new position in which the gauge wheels 41 are in a position to roll transversely of the tractor. Also, as shown in Figure 3, the implement frame occupies a higher position relative to the wheels 41 than the normally operating position shown in Figure 1. This aids in holding the tools out of contact with the ground when attaching or removing the implement.

After the gauge wheels 41 have been moved or changed into a transverse position, as shown in Figure 3, the link 71 connecting the arm 28 with the power lift arm 11 is disconnected, and then the wing nuts (on studs 39) holding the plates 35 to the tractor attaching plates 31 are removed. The tractor 1 is then backed a distance sufficient to disengage the attaching member 33 from the studs on the plates 31 and the slots 36. The member 33 then drops to the ground. Thus, the implement is freed of its connection to the tractor, the gauge wheels in their transverse position supporting the major portion of the weight of the implement and facilitating its movement out from underneath the tractor laterally of the latter.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement of the type adapted to be connected to a farm tractor on the underside thereof and adapted to be shifted laterally into and out of attaching position from the side of the tractor, the combination therewith of ground wheel means, and means for attaching said ground wheel means to said implement in two optional positions thereof, said attaching means comprising a part on said implement and two part-receiving sections on said ground wheel means, said sections being disposed, respectively, in planes lying at substantially 90° with respect to each other and so spaced relative to one another as to dispose said ground wheel means in one or the other of two positions, one in which the plane of said ground wheel means extends generally forwardly and the other in which the plane of said ground wheel means extends generally transversely relative to the direction of travel.

2. In a tractor mounted agricultural implement having ground working tools and adapted to be connected to the tractor in a transverse position generally underneath the tractor and extending laterally with respect thereto, detachable means for detachably connecting the implement with the tractor, a pair of ground engaging gauge wheels, wheel carrier means receiving each of said wheels, and wheel attaching means for connecting said gauge wheels to the ends of said implement with each of said wheels disposed optionally in two positions, one lying in a vertical forwardly extending plane and the other in a vertical transversely extending plane, one of said wheel attaching means and wheel carrier means including two part-receiving sections arranged in planes lying at 90° with respect to one another and the other of said wheel attaching means and wheel carrier means including a part received by said sections optionally, and means for fixing said part to either of said sections.

3. An agricultural implement adapted to be attached to a tractor generally underneath the latter and in a transverse position, and between the front and rear whels of the tractor, said implement comprising tool-supporting frame means, a gauge wheel receiving member at each end of the frame, a pair of gauge wheels, a yoke for each gauge wheel, each of said yokes having a pair of slots therein positioned to receive the associated gauge wheel receiving member, one slot extending in a direction and lying in a plane both of which are normal to the plane of said yoke, whereby when said supporting member is in place in said one slot the associated gauge wheel is mounted in a forward rolling direction and the other slot extending generally longitudinally of and lying generally in the plane of said yoke, whereby when the gauge wheel receiving member is inserted in said other slot, said gauge wheel is arranged to roll in a transverse direction, thereby facilitating bringing the implement into position under the tractor or removing the implement therefrom, and means for holding each of said gauge wheel yokes in either of their positions relative to said implement frame means.

4. A gauge wheel construction for use with an implement adapted to be connected with a tractor or other propelling means and to be shifted by a transverse movement into and out of a position facilitating the connection of the implement of the tractor, said gauge wheel construction comprising a gauge wheel receiving yoke having an attaching section, said section having a first slot extending in a plane parallel to the plane of the gauge wheel, and a second slot formed in said attaching section, said second slot being disposed in a plane perpendicular to said first plane, one of said slots extending into the yoke from one side and the other slot extending into the yoke from one end thereof, and means adapted to be carried by the implement in a fixed position thereon and to receive said attaching section in either of two positions by mounting the attaching section on said fixed means with the latter receiving one or the other of said slots.

5. A mounting for gauge wheels and the like comprising means serving as a gauge wheel supporting shank, a wheel-receiving yoke including an attaching section, said section having a pair of slots therein disposed respectively in planes arranged at an angle to one another and extending into said attaching section from different directions, each of said slots receiving said shank whereby said wheel-receiving yoke may be attached to said shank in either of two positions.

6. The invention set forth in claim 5, further characterized by means for attaching said yoke to said shank in either of said two positions, said means comprising a part received by said shank and passing through one of said slots when the shank is disposed in the other slot in one position, and through the other slot when said one slot receives the shank in the other position of said yoke.

7. An agricultural implement adapted to be attached to a tractor generally underneath the latter and in a transverse position, and between the front and rear wheels of the tractor, said implement comprising tool-supporting frame means, a gauge wheel receiving member at each end of the frame, a pair of gauge wheels, a yoke for each gauge wheel, each of said yokes having a pair of spaced apart means to receive the associated gauge wheel receiving member, one of said spaced apart means being arranged to dispose the associated gauge wheel in a position for rolling in a forward direction and the other of said spaced apart means being arranged to dispose the gauge wheel in a position to roll in a transverse direction, thereby facilitating bringing the implement into position under the tractor or removing the implement therefrom, and means engageable with each of said wheel receiving members and cooperating with either of the associated spaced apart means for holding each of said gauge wheel yokes in position relative to said implement frame means when the yoke is connected with the associated wheel receiving member through the other of the associated spaced apart means.

8. In an agricultural implement of the type adapted to be connected to a farm tractor on the underside thereof and adapted to be shifted laterally into and out of place from the side of the tractor, the combination of ground wheel means, means for attaching said ground wheel means to said implement in two optional positions thereof, one in which the plane of said ground wheel means extends generally forwardly whereby the ground wheel means may rotate in the direction of forward travel, and the other in which the plane of said ground wheel means extends generally transversely, thereby serving to support the implement for movement into and out of place relative to said tractor and in a lateral direction with respect thereto, said attaching means comprising a wheel-receiving part and a frame part and means for fixing one of said parts to the other part, one of said parts having spaced part-receiving sections disposed in such angular relation, one with respect to the other, that when the other part is fixed to one of said sections said ground wheel means is disposed in one of its optional positions and when said other part is fixed to the other of said part-receiving sections said ground wheel means is disposed in the other of its two optional positions, and means on said other part and engageable with a portion of said one of said spaced part-receiving sections, whereby the wheel-receiving part is held against displacement relative to said frame part when the wheel-receiving part is disposed in the other of said spaced part-receiving sections.

9. A mounting for gauge wheels and the like comprising means serving as a gauge wheel supporting shank normally extending vertically and generally rectangular in section at its lower end, a wheel-receiving yoke including an attaching section, said section havig a pair of slots therein disposed respectively in planes arranged at substantially 90° relative to one another, each of said slots having openings shaped to receive the lower end of said shank, and open ends facing different directions, whereby said wheel-receiving yoke may be attached to said shank in either of two positions.

10. The invention defined in claim 9, further characterized by said shank having an opening located so as to register with either of said slots when said shank end is disposed in the other slot, and a holding pin disposable in said opening and the slot registering therewith in either position of the yoke relative to said shank.

CLAUDE W. WALZ.
ROBERT D. GRIFF.

References Cited in the file of this patent

UNITED STATES PATENTS

| Number | Name | Date |
|---|---|---|
| 589,193 | Phinney | Aug. 31, 1897 |
| 1,661,237 | Shaw | Mar. 6, 1928 |
| 2,107,760 | McCormick et al. | Feb. 8, 1938 |
| 2,127,579 | Altgelt | Aug. 23, 1938 |
| 2,239,332 | Mee | Aug. 22, 1941 |
| 2,546,461 | Lewis | Mar. 27, 1951 |